United States Patent
Rupp et al.

[15] 3,635,831
[45] Jan. 18, 1972

[54] PRODUCTION OF HIGH-PURITY CESIUM-137

[72] Inventors: Arthur F. Rupp; John J. Pinajian; Stanley J. Rimshaw, all of Oak Ridge, Tenn.

[73] Assignee: The United States of America as represented by the United States Atomic Energy Commission

[22] Filed: Sept. 25, 1969

[21] Appl. No.: 861,193

[52] U.S. Cl. ....................................................252/301.1 R
[51] Int. Cl............................................................G21c 19/00
[58] Field of Search ..............................252/301.1 R; 176/37

[56] References Cited

UNITED STATES PATENTS

| 3,240,555 | 3/1966 | Nash | 176/37 X |
| 3,278,386 | 10/1966 | French et al. | 176/37 |

Primary Examiner—Carl D. Quarforth
Assistant Examiner—R. L. Tate
Attorney—Roland A. Anderson

[57] ABSTRACT

A method has been provided for the production of high-purity cesium–137 free of cesium–134. Concentrated $^{137}$Cs free of $^{134}$Cs is obtained by removing nonsoluble gases, including xenon isotopes, from an operating reactor and passing these gases through a stainless steel mesh at a point in time of the gas removal path to optimize the decay of $^{137}$Xe to $^{137}$Cs. Since cesium is highly reactive, it will react with the mesh and thereby be deposited thereon. The mesh is then periodically removed from the gas stream and washed with water to remove the solids enriched in $^{137}$Cs.

6 Claims, No Drawings 3,635,831

PRODUCTION OF HIGH-PURITY CESIUM-137

BACKGROUND OF THE INVENTION

One of the most widely used radioisotopes for industrial application is $^{137}Cs$. The source of this nuclide is the fission-product "waste" from nuclear reactors. The fissioning of uranium produces, among other radioisotopes, three principal xenon isotopes: $^{133}Xe$, $^{135}Xe$, and $^{137}Xe$. These xenon isotopes, in turn, decay to the respective cesium isotopes: $^{133}Cs$, $^{135}Cs$, and $^{137}Cs$. These three cesium isotopes are produced in substantially equal amounts and the total production is about 0.1 g. of cesium for each 1 g. of $^{235}U$ that is fissioned. However, the $^{133}Cs$ undergoes an $(n,\gamma,)$ reaction and produces $^{134}Cs$, which emits high-energy gamma rays. Consequently, any cesium product has a mixture of several isotopes, one of which ($^{133}Cs$) is stable; thus the specific activity and isotopic purity of a so-called $^{137}Cs$ source are limited by these impurities. Furthermore, the radiation of the $^{134}Cs$ necessitates additional shielding for any processing, handling, or use. This is partially overcome by aging the cesium to permit decay of the $^{134}Cs$.

This limitation of specific activity is detrimental in at least two aspects. For example, if a point source is desired for some irradiation application, the strength of the source is necessarily low, and yet if a strong source is desired, a large quantity of cesium is required, but the upper limit is controlled by self-absorption in the source itself. Thus, it is desirable to have high-purity $^{137}Cs$.

One method of accomplishing the production of higher purity $^{137}Cs$ is by using electromagnetic separators; but this is an expensive method because of the relatively low efficiency, difficult handling problems due to the radiation, and costly equipment. Consequently, this method has not been utilized.

SUMMARY OF THE INVENTION

It is an object of this invention to provide a simple, inexpensive method for the production of high-purity $^{137}Cs$.

Further, it is an object of this invention to provide a method for the production of high-purity $^{137}Cs$ in which the fission gases from a reactor containing $^{137}Xe$ are passed onto a stainless steel medium placed in a reactor off-gas line at a point removed from the reactor to allow sufficient time for the $^{137}Xe$ to decay to $^{137}Cs$ which deposits on the stainless steel in a highly purified form.

Other objects and the attendant advantages of the present invention will be evident from the following description.

TECHNICAL DISCLOSURE

The present method for economically producing $^{137}Cs$ in substantially pure form is accomplished by exploiting a feature of certain nuclear reactor systems wherein the fission gases are continuously removed from the operating reactor by an off-gas stream. These gases are removed to reduce the neutron poisons from the reactor core in, for example, a molten salt reactor. In such a reactor $^{135}Xe$ is the principal poison that must be removed. Xenon is essentially insoluble in the molten fluorides (and in most fuels) and thus it can be removed from the reactor, This xenon then decays to the respective isotopes of cesium.

As discussed above, the main xenon isotopes are 5.27-day $^{133}Xe$ which decays to stable cesium, 9.2-hour $^{135}Xe$ which decays to a long-lived $^{135}Cs$, and 3.9-minute $^{137}Xe$ which decays to $^{137}Cs$. It has been found that, if the gases from the reactor are passed through a stainless steel mesh or alternatively delayed for a relatively short period of time, e.g., 15 minutes, in a continuous throughput holdup tank, the majority (90 percent or greater) of the $^{137}Xe$ will have decayed to $^{137}Cs$ with very little decay of the other xenon isotopes to their respective cesium isotopes. The short-lived xenon isotopes decay in transit to cesium isotopes which are trapped by the mesh or alternatively plate out on the stainless steel surface of a holdup tank. The mesh is then removed periodically and the activity is leached from the mesh by washing with boiling water. Since this production of cesium is outside the reactor, there is no accumulation of $^{133}Cs$ which is transformed to the deleterious $^{134}Cs$.

Having thus described the invention the following example is provided to more clearly show the results which are attained by this invention.

EXAMPLE

A particle trap including stainless steel mesh with an activity reading of 1,125 R/hr. on a gamma scanner was removed from an off-gas filter of the Molten Salt Reactor Experiment (MSRE) and was placed in an empty stainless steel can. Further readings on the stainless steel mesh through a narrow slit in the lead collimator of the gamma scanner showed that activity distribution on the mesh was uneven with high and low readings being obtained at the mesh ends and an intermediate reading in the middle of the mesh. An analysis of the data from the multichannel analyzer on the relative distribution of pulse heights in a NaI crystal detector indicated the presence of only $^{137}Cs$ gamma activity. No other gamma emitter could be detected at this point.

The mesh was then covered with water and boiled for 1 hour. Control readings on the gamma scanner indicated that >95 percent of the activity was removed by the hot-water leach. The reading of 1,125 R/hr. dropped to 29.5 R/hr. after leaching away the activity with water. The cell background was 10 to 15 R/hr.

The total volume of leach solution was 3,450 ml. Analysis of this solution gave 12.3 curies/liter or a total of 42 curies of $^{137}Cs$ activity in the mesh. This amount of activity corresponds to 0.81 g. of cesium, which could account for the grayish-white salt observed on the mesh.

Strontium-90 and strontium-89 analyses showed 0.044 and 0.008 curies/liter, respectively, (83 % $^{90}Sr$ and 17 % $^{89}Sr$ activity). Thus, the mesh contained a total of 0.15 curie of $^{90}Sr$. Since the curie amounts of $^{137}Cs$ and $^{90}Sr$ that are formed in fission are nearly equal to each other, it can be seen that much more of the $^{137}Cs$ chain was volatilized and caught in the mesh than the $^{90}Sr$ chain.

A mass-spectrometric analysis gave the following cesium isotope abundances: 3.4% $^{133}Cs$, 38.7% $^{135}Cs$, and 57.9% $^{137}Cs$. These abundances are related to the half-lives of the corresponding xenon precursors. Only a small fraction of the relatively long-lived $^{133}Xe$ decayed to cesium and was caught by the mesh. Most of the $^{133}Xe$ passed through the mesh and decayed further up the line to $^{133}Cs$.

The results indicate that cesium isotopes enriched in $^{137}Cs$ can be trapped on stainless steel mesh in the off-gas line of an operating molten salt reactor. Cesium is probably present in aerosol form and thus would also plate out on the walls of the off-gas line.

In the alternative arrangement, a 15-minute holdup tank consisting of stainless steel is placed in the fission-gas extraction line of the reactor. Periodically, this tank is removed and washed with water to remove the solids containing predominantly $^{137}Cs$. To best accomplish tank insertion and removal, a plurality of holdup tanks may be provided in parallel with appropriate valving and disconnects.

Since the rate of production of xenon isotopes via the fissioning of $^{235}U$ and the subsequent decay of the xenon isotopes is well known, the production rate can be calculated. In the MSRE, for example, when operating at 7.5 MW there is ≈0.25 g. of $^{137}Cs$ produced per day or 24 curies per day. In a 200-MW reactor, the rate is about 600 curies per day. This material has a specific activity more than three times that of the $^{137}Cs$ previously available and is about 99 percent that of pure $^{137}Cs$.

While the foregoing method is primarily useful for the production of $^{137}Cs$, benefits will be gained in the production of certain strontium isotopes through the decay of krypton isotopes, as pointed out in the example above. For example, a significant amount of $^{88}Sr$ and $^{90}Sr$ will be produced from the decay of $^{88}Kr$ and $^{90}Kr$, respectively. These strontium isotopes can be removed with the cesium during recovery processing by leaching the stainless with dilute hydrochloric acid and separating the isotopes by conventional ion-exchange techniques.

Thus, it will be seen that a simple, inexpensive method has been provided for the production of high-purity $^{137}$Cs.

What is claimed is:

1. A method of recovering high-purity $^{137}$Cs essentially free of $^{134}$Cs, from fission gases containing $^{137}$Xe removed from a nuclear reactor, comprising the steps of:

continuously removing said gases from said reactor in an off-gas stream;

holding said gases at a point outside the reactor neutron environment for a period longer than the half-life of $^{137}$Xe but shorter than about 1 hour to permit decay of a substantial part of said $^{137}$Xe to $^{137}$Cs;

directing said gases containing $^{137}$Cs onto a stainless steel medium whereupon said $^{137}$Cs is deposited upon the contacted surfaces of said stainless steel medium and the remaining fission gases are carried past said medium so as to obtain high purity $^{137}$Cs on said medium; and recovering said $^{137}$Cs from said stainless steel medium.

2. The method as set forth in claim 1 wherein said stainless steel medium is in the form of a stainless steel mesh placed in said off-gas stream at a distance from said reactor to allow sufficient time for the decay of $^{137}$Xe to $^{137}$Cs.

3. The method as set forth in claim 2 wherein said $^{137}$Cs is leached from said mesh by submerging said mesh in boiling water.

4. The method as set forth in claim 1 wherein said stainless steel medium is in the form of a continuous throughput holdup tank wherein said fission gases are held for a period of time to optimize the decay of $^{137}$Xe to $^{137}$Cs and subsequent depositing of said $^{137}$Cs on said tank walls.

5. The method as set forth in claim 4 wherein said off-gas stream passing into said holdup tank is held in said tank for approximately 15 minutes.

6. The method as set forth in claim 5 wherein said recovery step comprises directing said off-gas stream from said holdup tank, removing the gases from said tank, and washing said $^{137}$Cs activity from the tank walls with water.

6. The method as set forth in claim 5 wherein said recovery step comprises directing said off-gas stream from said holdup tank, removing the gases from said tank, and washing said $^{137}$Cs activity from the tank walls with water.

* * * * *